US008079062B2

(12) United States Patent
Jennings et al.

(10) Patent No.: US 8,079,062 B2
(45) Date of Patent: Dec. 13, 2011

(54) METHOD AND SYSTEM USING PRESENCE INFORMATION TO MANAGE NETWORK ACCESS

(75) Inventors: Cullen F. Jennings, San Jose, CA (US); Cary W. FitzGerald, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 941 days.

(21) Appl. No.: 11/129,949

(22) Filed: May 16, 2005

(65) Prior Publication Data

US 2006/0259958 A1  Nov. 16, 2006

(51) Int. Cl.
*H04L 9/00* (2006.01)
(52) U.S. Cl. ......... 726/3; 370/352; 379/93.01; 709/224; 709/244; 713/154; 713/200
(58) Field of Classification Search .................. 713/154, 713/200, 155; 370/352; 709/224, 244; 379/93.01
See application file for complete search history.

(56) References Cited

U.S. PATENT DOCUMENTS

| | | | |
|---|---|---|---|
| 3,963,874 A | 6/1976 | Pommerening et al. ......... 179/18 |
| 4,809,321 A | 2/1989 | Morganstein et al. ......... 379/211 |
| 5,134,610 A | 7/1992 | Shand et al. ..................... 370/60 |
| 5,526,416 A | 6/1996 | Dezonno et al. ............... 379/265 |
| 5,649,105 A | 7/1997 | Aldred et al. ............ 395/200.04 |
| 5,724,420 A | 3/1998 | Torgrim ......................... 379/372 |
| 5,742,905 A | 4/1998 | Pepe et al. ..................... 455/461 |
| 5,940,591 A | 8/1999 | Boyle et al. .............. 395/187.01 |
| 5,991,645 A | 11/1999 | Yuen et al. ..................... 455/568 |
| 6,295,354 B1 | 9/2001 | Dezonno ........................ 379/266 |
| 6,301,339 B1 * | 10/2001 | Staples et al. ............... 379/93.01 |
| 6,353,886 B1 | 3/2002 | Howard et al. ................ 713/156 |
| 6,463,471 B1 * | 10/2002 | Dreke et al. ................... 709/224 |
| 6,501,750 B1 | 12/2002 | Shaffer et al. ................. 370/352 |
| 6,510,162 B1 | 1/2003 | Fijolek et al. ................. 370/432 |
| 6,546,087 B2 | 4/2003 | Shaffer et al. ............... 379/90.01 |
| 6,546,097 B1 | 4/2003 | Peltz ......................... 379/265.07 |
| 6,567,505 B1 | 5/2003 | Omori et al. ..................... 379/84 |
| 6,697,462 B2 | 2/2004 | Raymond .................. 379/93.02 |
| 6,748,543 B1 | 6/2004 | Vilhuber ........................ 713/201 |
| 6,751,463 B1 | 6/2004 | Lorello et al. ................. 455/466 |
| 6,754,712 B1 | 6/2004 | Valencia ........................ 709/227 |
| 6,757,722 B2 | 6/2004 | Lonnfors et al. .............. 709/220 |
| 6,760,322 B1 | 7/2004 | Fukuda et al. ................ 370/352 |
| 6,766,165 B2 | 7/2004 | Sharma et al. ................ 455/423 |
| 6,785,266 B2 | 8/2004 | Swartz ........................... 370/352 |

(Continued)

OTHER PUBLICATIONS

Richardson et al. "Virtual Network Computing." Published in IEEE Internet Computing vol. 2, No. 1. Jan./Feb. 1998. p. 33-38.*

(Continued)

*Primary Examiner* — Vivek Srivasava
*Assistant Examiner* — Kevin Richards
(74) *Attorney, Agent, or Firm* — Baker Botts L.L.P.

(57) ABSTRACT

In accordance with a particular embodiment of the present invention, a method using presence information to manage network access includes maintaining presence information for an end user. When a remote access request is received from the end user at a remote endpoint, the presence information for the end user is updated to identify the presence of the end user at one or more network endpoints associated with a private network. An access point to the private network is then automatically configured to allow any communications addressed to an IP address associated with the one or more network endpoints to pass through the access point.

20 Claims, 2 Drawing Sheets

U.S. PATENT DOCUMENTS

| | | | |
|---|---|---|---|
| 6,788,779 B2 | 9/2004 | Ostapchuck | 379/265.02 |
| 6,807,423 B1 | 10/2004 | Armstrong et al. | 455/440 |
| 6,853,634 B1 | 2/2005 | Davies et al. | 370/349 |
| 6,928,473 B1 | 8/2005 | Sundaram et al. | |
| 6,930,983 B2 | 8/2005 | Perkins et al. | 370/252 |
| 6,959,184 B1 | 10/2005 | Byers et al. | 455/410 |
| 7,010,292 B2 | 3/2006 | Jerbi et al. | 455/414.1 |
| 7,039,713 B1 | 5/2006 | Van Gunter et al. | 709/229 |
| 7,042,988 B2 | 5/2006 | Juitt et al. | 379/88.17 |
| 7,043,643 B1 | 5/2006 | Doe et al. | 713/189 |
| 7,043,753 B2 | 5/2006 | Roddy et al. | 726/11 |
| 7,058,387 B2 | 6/2006 | Kumar et al. | 455/406 |
| 7,062,563 B1 | 6/2006 | Lewis et al. | 709/227 |
| 7,149,801 B2 | 12/2006 | Burrows et al. | 709/225 |
| 7,242,421 B2 | 7/2007 | Center, Jr. et al. | 348/14.1 |
| 7,260,632 B2 | 8/2007 | Shaffer et al. | 709/224 |
| 7,379,461 B2 | 5/2008 | Wu et al. | 370/395.2 |
| 7,418,736 B2 | 8/2008 | Ghanea-Hercock | 726/28 |
| 2001/0042202 A1* | 11/2001 | Horvath et al. | 713/154 |
| 2002/0019853 A1 | 2/2002 | Vange et al. | 709/207 |
| 2002/0024947 A1* | 2/2002 | Luzzatti et al. | 370/352 |
| 2002/0112073 A1 | 8/2002 | MeLampy et al. | 709/240 |
| 2002/0150041 A1 | 10/2002 | Reinshmidt et al. | 370/216 |
| 2002/0172365 A1 | 11/2002 | Nakagomi et al. | |
| 2002/0181394 A1 | 12/2002 | Partain et al. | |
| 2003/0107991 A1 | 6/2003 | Tezuka et al. | 370/229 |
| 2003/0225549 A1 | 12/2003 | Shay et al. | |
| 2004/0034793 A1* | 2/2004 | Yuan | 713/200 |
| 2004/0071084 A1 | 4/2004 | El-Hennawey et al. | 370/230 |
| 2004/0073690 A1 | 4/2004 | Hepworth et al. | 709/230 |
| 2004/0249910 A1 | 12/2004 | Jerbi et al. | 709/222 |
| 2005/0022180 A1 | 1/2005 | Couturier | 717/173 |
| 2005/0066033 A1 | 3/2005 | Cheston et al. | |
| 2005/0075842 A1 | 4/2005 | Ormazabal et al. | 702/188 |
| 2005/0083912 A1* | 4/2005 | Afshar et al. | 370/352 |
| 2005/0086495 A1 | 4/2005 | Sheth et al. | 713/182 |
| 2005/0188194 A1* | 8/2005 | Fascenda | 713/155 |
| 2005/0210148 A1* | 9/2005 | Kato et al. | 709/244 |
| 2005/0228895 A1 | 10/2005 | Karunamurthy et al. | 709/229 |
| 2005/0232184 A1 | 10/2005 | Borella | 370/352 |
| 2005/0262195 A1 | 11/2005 | Ono et al. | 709/203 |
| 2005/0283837 A1 | 12/2005 | Olivier et al. | 726/24 |
| 2006/0041936 A1 | 2/2006 | Anderson et al. | |
| 2006/0047782 A1 | 3/2006 | Niemi | 709/220 |
| 2006/0070003 A1 | 3/2006 | Thompson et al. | 715/758 |
| 2006/0095560 A1 | 5/2006 | Wu et al. | 709/224 |
| 2006/0130127 A1 | 6/2006 | Kaler et al. | 726/7 |
| 2006/0165064 A1 | 7/2006 | Brown et al. | 370/352 |
| 2006/0167991 A1 | 7/2006 | Heikes et al. | |
| 2006/0253458 A1 | 11/2006 | Dixon et al. | 707/10 |

OTHER PUBLICATIONS

PCT Search Report for International Application No. PCT/US06/17331, 9 pages. Sep. 6, 2006.

S. Blake et al., "An Architecture for Differentiated Services," RFC 2475, The Internet Society, 36 pages, 1998.

E. Crawley et al., "RFC 2386-A Framework for QoS-based Routing in the Internet," RFC 2386, The Internet Society, 31 pages, 1998.

M Day et al., "A Model for Presence and Instant Messaging," RFC 2778, The Internet Society, 17 pages, 2000.

RealVNC, *About RealVNC*, RealVNC Ltd., 3 pages, 2002-2004.

Nortel Networks, *Eliminating Boundaries*, www.nortelnetworks.com, pp. 1-10, 2004.

www.webopedia.com,*firewall* definition, 2 pages, Aug. 26, 2004.

www.webopedia.com, *virtual network computing* definition, 2 pages, Jan. 21, 2005.

U.S. Appl. No. 11/089,743, entitled *Method and System Using Quality of Service Information for Influencing a User's Presence State*, by Cullen F. Jennings et al., pp. 1-34 plus 2 pages of drawings, filed Mar. 25, 2005.

U.S. Appl. No. 11/092,782, entitled *Method and System Indicating a Level of Security for VOIP Calls Through Presence*, by Cary W. Fitzgerald et al., pp. 1-37 plus 2 pages of drawings, filed Mar. 28, 2005.

U.S. Appl. No. 11/130,439, entitled *Method and System Using Shared Configuration Information to Manage Network Access for Network Users*, by Cullen F. Jennings et al., pp. 1-40 plus 2 pages of drawings, filed May 16, 2005.

U.S. Appl. No. 11/129,970, entitled *Method and System to Protect the Privacy of Presence Information for Network Users*, by Cullen F. Jennings et al., pp. 1-35 plus 3 pages of drawings, filed May 16, 2005.

USPTO Office Action, for U.S. Appl. No. 11/089,743, Jennings, Sep. 23, 2008.

USPTO Office Action, for U.S. Appl. No. 11/092,782, Fitzgerald, Nov. 28, 2008.

USPTO Office Action for U.S. Appl. No. 11/130,439, Filing date May 16, 2005, inventor Jennings, 13 pages, Apr. 6, 2009.

USPTO Office Action for U.S. Appl. No. 11/089,743, Filing date Mar. 25, 2005, inventor Jennings, 15 pages, Apr. 15, 2009.

USPTO Office Action for U.S. Appl. No. 11/092,782, Filing date Mar. 28, 2005, inventor FitzGerald, 12 pages, May 18, 2009.

USPTO Office Action for U.S. Appl. No. 11/089,743, Filing date Mar. 25, 2005, inventor Jennings, 12 pages, Jul. 23, 2009.

*USPTO; Office Action* for U.S. Appl. No. 11/089,743 filed Mar. 25, 2005 in the name of Cullen F. Jennings; 10 pages, Jan. 21, 2010.

*USPTO; Office Action* for U.S. Appl. No. 11/129,970 filed May 16, 2005 in the name of Cullen F. Jennings; Examiner Melur Ramalcrishnalah; 10 pages, Sep. 16, 2009.

*USPTO; Office Action* for U.S. Appl. No. 11/092,782 filed Mar. 28, 2005 in the name of Cary W. FitzGerald; 11 pages, Oct. 19, 2009.

*USPTO; Office Action* for U.S. Appl. No. 11/130,439 filed May 16, 2005 in the name of Cullen F. Jennings; 12 pages, Nov. 18, 2009.

*State Intellectual Property Office of the People's Republic of China; The First Office Action* for Application No. 200680010477.1; 9 pages, Jan. 8, 2010.

*USPTO; Office Action* for U.S. Appl. No. 11/092,782 filed Mar. 28, 2005 in the name of Cary W. FitzGerald; 13 pages, Apr. 6, 2010.

*USPTO Office Action* for U.S. Appl. No. 11/089,743 in the name of Cullen F. Jennings; 15 pages, Aug. 19, 2010.

*USPTO; Office Action* for U.S. Appl. No. 11/092,782 in the name of Cary W. FitzGerald; 16 pages, Nov. 12, 2010.

* cited by examiner

METHOD AND SYSTEM USING PRESENCE INFORMATION TO MANAGE NETWORK ACCESS

RELATED APPLICATIONS

The present application is related to co-pending U.S. patent application Ser. No. 11/089,743, entitled Method and System Using Quality of Service Information for Influencing a User's Presence State, filed Mar. 25, 2005; Ser. No. 11/092,782, entitled Method and System Indicating a Level of Security for VoIP Calls Through Presence, filed Mar. 28, 2005; Ser. No. 11/130,439, entitled Method and System Using Shared Presence Information to Manage Network Access for Network Users, filed May 16, 2005; and Ser. No. 11/129,970, entitled Method and System to Protect the Privacy of Presence Information for Network Users, filed May 16, 2005, the disclosures of which are hereby incorporated by reference, as if fully set forth herein.

TECHNICAL FIELD OF THE INVENTION

This invention relates in general to communication systems and, more particularly, to a method and system using presence information to manage network access.

BACKGROUND OF THE INVENTION

A private network system generally includes a number of network devices, such as switches, routers, and others, connected so as to allow communication among the devices and end station devices such as desktop machines, servers, hosts, printers, fax machines, and others. To receive communications initiating external to the private network, the devices may be configured such that a firewall or other access point includes pinholes through which such traffic is allowed to pass.

Many companies have a desire to provide remote access to their private networks such that employees and other interested individuals can access the private network from remote sites. Virtual Network Computing software and other software and protocols make it possible to view and fully-interact with one computer from any other computer or mobile device anywhere on the Internet. Although such applications and protocols allow an individual to use a remote device as if that individual is on a network device, the applications and protocols do not provide for the automatic configuration of the remote device to open pinholes in the firewall or other access point to externally generated communications.

SUMMARY OF THE INVENTION

The present invention provides a method and system using presence information to manage network access that substantially eliminates or reduces at least some of the disadvantages and problems associated with previous methods and systems.

In accordance with a particular embodiment of the present invention, a method using presence information to manage network access includes maintaining presence information for an end user. When a remote access request is received from the end user at a remote endpoint, the presence information for the end user is updated to identify the presence of the end user at one or more network endpoints associated with a private network. An access point to the private network is then automatically configured to allow any communications addressed to an IP address associated with the one or more network endpoints to pass through the access point.

Certain embodiments of the present invention may provide a number of technical advantages. For example, according to one embodiment of the present invention, an architecture and a process are provided that allow for the automatic configuration of an access point to a private network based upon presence information for a network user. The automatic configuration allows communications addressed to an IP address associated with a network endpoint to automatically pass through the access point. A further technical advantage may be that the maintenance of presence information with respect to network users may allow pinholes or other access configurations associated with a network endpoint to follow a network user from endpoint to endpoint regardless of the network user's actual location. Specifically, presence policy may be used to apply access configurations for one endpoint to another endpoint where the presence of the end user is detected at an endpoint. As a result, when the network user accesses the private network through a remote endpoint, the configurations of a network endpoint associated with the user are automatically applied to the remote endpoint.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
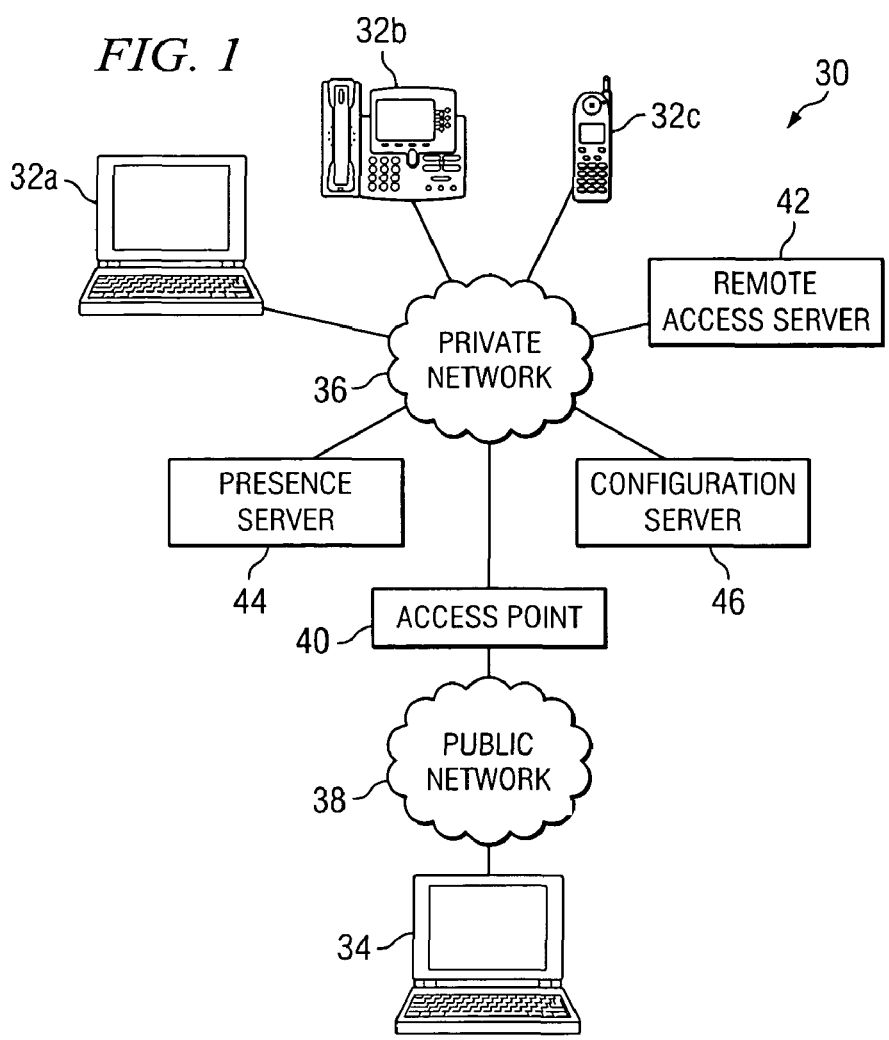
FIG. 1 illustrates a network system that uses presence information to manage remote access to the network in accordance with a particular embodiment of the present invention.

FIG. 1 illustrates a network system 30 that uses presence information to manage remote access to a private network 36 in accordance with a particular embodiment of the present invention. Network system 30 includes a plurality of network endpoints 32*a*-32*c* having the ability to communicate with one another and with other network devices using a private network 36. A remote endpoint 34 may communicate with network endpoints 32*a*-32*c* and other network devices using a combination of private network 36 and a public network 38. In particular embodiments, a network user may access private network 36 from remote endpoint 34 through an access point 40, such as a firewall. One or more remote access applications stored on a remote access server 42 operate to authenticate the network user and associate remote endpoint 34 with an IP address assigned to a network endpoint 32. As a result, the network user of remote access server 42 is able to interact with a network computer 32 as if that network user were present at the network computer 32.

Communications and other data from remote endpoint 34 enters private network 36 through access point 40. To enable a network endpoint 32 to receive such communications and data, access point 40 applies access configurations and settings that are established for the network endpoint 32 by an associated end user. In particular embodiments, the access configurations and settings may define one or more pinholes in access point 40 that are particular to the specific network endpoint 32. The pinholes may define criteria that, if satisfied by an incoming communication or other data, result in the communication or data being automatically accepted by access point 40. Thus, incoming communications and other data are examined at access point 40 to determine if the communications or data satisfy the pinhole criteria before the communications are delivered to the addressed endpoint. If the criteria is not met, the communications or data are not allowed into private network 36. The management of presence information by network system 30, however, allows the pinhole configurations accepted by an network endpoint 32 to be automatically applied to a remote endpoint 34. Additionally, presence information managed by a presence server 44 is used identify the presence of the network user and enable the automatic configuration of access point 40 such that communications generated external to private network 36 are allowed to pass through private network 36 as if the network user were at the network computer.

As described above, network system 30 includes private network 36. "Private network" should be interpreted, however, as generally defining any network capable of transmitting audio and/or video telecommunication signals, data, and/or messages, including signals, data or messages transmitted through text chat, instant messaging and e-mail. Accordingly, private network 36 may be implemented as a local area network (LAN), wide area network (WAN), global distributed network such as the Internet, Intranet, Extranet, or any other form of wireless or wireline network.

Generally, private network 36 provides for the communication of packets, cells, frames, or other portions of information (generally referred to as packets herein) between network endpoints 32a-32c and other network devices. It is generally recognized that private network 36 may include any combination of network components, gatekeepers, telephony servers, routers, hubs, switches, gateways, endpoints, or other hardware, software, or embedded logic implementing any number of communication protocols that allow for the exchange of packets in network system 30. In particular embodiments, private network 36 may include a local area network (LAN) that enables endpoints 32 and 34 distributed across multiple cities and geographic regions to establish data sessions between and among the network components coupled to private network 36.

As will be described in more detail below, a remote endpoint 34 may gain access to private network 36 through public network 38. Public network 38 may comprise any computer network such as the Internet, an extranet, or other known or hereinafter developed network for the communication of data. As technical background, the Internet is a world wide network of networks that links many computers through many separate, but inter-communicating, networks. Using the Internet, network users can establish communication with private network 36 through Internet capable remote endpoints 34.

It will be recognized by those of ordinary skill in the art that network endpoints 32a-32c, remote endpoint 34, remote access server 42, and/or access point 40 may be any combination of hardware, software, and/or encoded logic that provides data communication services to end users of private network 36. For example, each network endpoint 32a-32c and remote endpoint 34 may include a computing device, such as a desktop personal computer, an IP phone, a cell phone or any other communication hardware, software, and/or encoded logic that supports the communication of data packets of media (or frames) using private network 36. Endpoints 32a-32c and 34 may also include unattended or automated systems, servers, gateways, other intermediate components, or other devices that can establish data sessions. Although FIG. 1 illustrates a particular number and configuration of network endpoints 32a-32c, remote endpoints 34, and access points 40, network system 30 contemplates any number or arrangement of such components for communicating data. Furthermore, network endpoints 32 and 34 of system 30 may be associated with any number of end users.

For the provision of remote access services to remote endpoint 34, remote access server 42 includes remote access software that allows a network user of remote endpoint 34 to interact with a network endpoint, such as network endpoint 32a, as if the network user were present at network computer 32a. In particular embodiments, for example, remote access server 42 may include Virtual Network Computing (VNC) software. Because VNC software runs on a wide variety of hardware/software platforms, including Microsoft Windows 3.x/95/98/NT/CE, Linux 2.x for x86, Solaris 2.5 (Sun Sparc workstation), Apple Macintosh, and other generally available platforms, remote endpoint 34 and network endpoint 32a may interact even where these endpoints are running on two different platforms or operating systems.

In an exemplary VNC session initiated by a user of remote endpoint 34, a remote access request message may be transmitted from remote endpoint 34 through access point 40 to remote access server 42. Remote access server 42 may use authentication and authorization processes to identify the network user. Once remote endpoint 34 is linked to remote access server 42, a viewer display provided by remote access server 42 presents the identified desktop of network endpoint 32a and the network user of remote endpoint 34 may manipulate objects on network 32a in a real time manner just as if the network user were sitting at network endpoint 32a. As stated above, remote endpoint 34 may operate on various platforms and may include a personal computer, a server, a hand-held device, or any device with appropriate processing and display functionality amenable to connection to private network 36.

In particular embodiments, private network 36 employs communication protocols that allow for the addressing or identification of network endpoints 32a-32c and other network devices of private network 36. For example, using Internet protocol (IP), each of the components coupled together by private network 36 in network system 30 may be identified using IP addresses. Technology that allows telecommunications to be transmitted over an IP network may comprise Voice over IP (VoIP), or simply Voice over Packet (VoP). The transmission of data using this technology may include placing the data in packets and sending each packet individually to the selected destination, along one or more communication paths. In this manner, private network 36 may support any form and/or combination of point-to-point, multicast, unicast, or other techniques for exchanging media packets among components in network system 30. Any network components capable of exchanging audio, video, or other data using frames or packets, are included within the scope of the present invention.

In particular embodiments, network system 30 may receive and transmit data in a session initiation protocol (SIP) environment. SIP is an application-layer control protocol that includes primitives for establishing, modifying, and terminating communication sessions. SIP works independently of underlying transport protocols and without dependency on the type of session that is being established. SIP also transparently supports name mapping and redirection services, which support personal mobility.

Within network system 30, presence information maintained by presence server 44 may be used to detect the presence of end users at network devices 32a-32c. For example, users of endpoints 32a-32d may be identified by components of system 30 according to a uniform reference identifier (URI), such as a user's email address, or other suitable identifier so that a user may be located, monitored, and/or contacted through presence detection technology. Presence detection technology allows end users to maintain a single externally visible identifier regardless of their network location. For discovering one another for purposes of determining the availability of a network user associated with a network endpoint 32, for locating prospective session participants, and for other functions, an infrastructure of network hosts, such as presence server 44, may be created to which users of network endpoints 32a-32c can send registrations, invitations to sessions, and other requests.

For example, presence server 44 may enable network endpoints 32a-32c to discover one another for purposes of determining the availability of network users with respect to associated network endpoints 32a-32c. Thus, components of network system 30 may capture information about various communication devices, or endpoints, available to a user and their status, such as whether a cellular phone is switched on or whether a network user is logged into a personal computer (PC) by accessing information maintained by presence server 44. By querying presence server 44, a network endpoint 32 may obtain a presence availability status for network users, as well as location information, device information, and any personal presence status that a network user wishes to communicate to other network users. Hence, communication system 30 provides enhanced information about network users of network endpoints 32a-32c. Although this may be achieved using a VoIP platform, the versatility of presence detection technology enables it to be used in both IP components, such as IP phone 32b, and other non-IP components.

In particular embodiments, SIP may also include primitives that use presence information maintained by presence server 44 to support session setup capabilities for remote endpoint 34. Specifically, the presence information may be used to identify a network user's presence with respect to a network endpoint, such as network endpoint 32a, even where that network user is accessing private network 36 from a remote endpoint 34 that is external to private network 36. In one example scenario, a network user associated with network endpoint 32a may desire to access private network 36 using remote endpoint 34 and public network 38. Accordingly, the network user may use remote endpoint 34 to send a network access request message via public network 38. The access request message may be received by access point 40 of private network 36.

Access point 40 may include hardware and/or software designed to prevent unauthorized access to private network 36. In particular embodiments, access point 40 may include a firewall that operates to receive externally generated messages directed at components of private network 36 and examine such messages to determine whether those messages meet specified security criteria. Where the specified security criteria are met, the externally generated messages may be allowed through access point 40. With respect to the above described example scenario, access point 40 may be configured to allow network access request messages to pass through access point 40. Such request messages may be forwarded to remote access server 42 for authorization and processing using remote access software, such as that provided by VNC. Upon authorization of the network user, remote endpoint 34 may be given access to a network endpoint associated with the network user.

In response to authorizing the network user of remote endpoint 34, presence information maintained by presence server 44 may be updated to identify the network user's presence on network endpoint 32a. In particular embodiments, the presence information maintained by presence server 44 may be used by a configuration server 46 to apply configuration information associated with network endpoint 32a to access point 40 even where the network user is accessing network resources through remote endpoint 34. In particular embodiments, configuration server 46 includes any combination of hardware (microprocessors, controllers, data storage systems, or other suitable computing devices or resources), software, and/or encoded logic that may be used to store configuration information associated with network endpoints 32a-32c for application to access point 40. The configuration information may identify one or more pinholes or other network access configurations that are applied by access point 40.

Where a network user accesses private network 36 through remote endpoint 34, configuration information associated with the network user and one or more network endpoints 32a-32c may be applied to remote endpoint 34 based on presence policy. For example, the pinhole configurations adopted by a first network endpoint 32a may be automatically applied to remote endpoint 34 if the presence information identifies the network user as present at first network endpoint 32a. Accordingly, when a network user who is associated with network endpoint 32a access private network 36 from remote endpoint 34, presence information associated with network endpoint 32a may be updated to identify the network user as present or active at endpoint 32a. As a result, access point 40, remote access server 42, configuration server 46, or another network device may identify the applicability of configuration information associated with network endpoint 32a to remote endpoint 34. Accordingly, pinhole and other access configurations that are associated with network endpoint 32a may be applied to remote endpoint 34.

It will be recognized by those of ordinary skill in the art that network system 30 is merely one example configuration of a communications network using presence policy to maintain and apply network access configurations. Accordingly, it is generally recognized that network system 30 may include any number of servers, memory modules, access points, endpoints, or other components to accomplish the functionality and features described herein. Additionally, it is recognized that the functionality described as relating to the individual components of network system 30 may be implemented by any component of network system 30. For example, it is generally recognized that configuration information for the network endpoints may be stored in configuration server 46, presence server 44, remote access server 42, access point 40, or any other component of network system 30.

Figure 2:
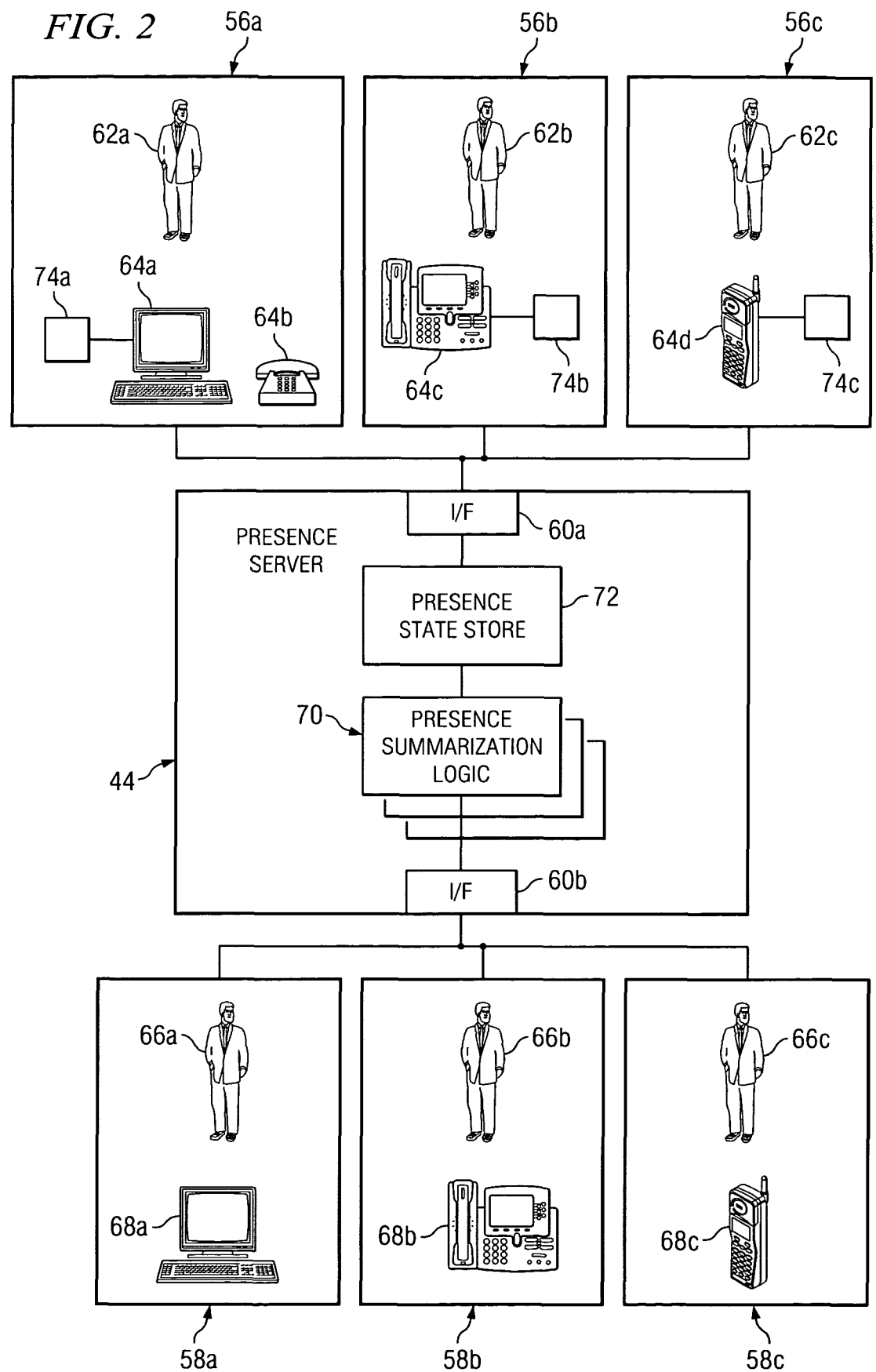
FIG. 2 illustrates the presence server of FIG. 1 in more detail, illustrating aspects of the present invention.

FIG. 2 illustrates presence server 44 in more detail, in accordance with a particular embodiment of the present invention. Specifically, presence server 44 is coupled to one or more presentities 56 and one or more presence watchers 58 through private network 36. Interfaces 60 allow presence server 44 to obtain information from presentities 56 and provide information to presence watchers 58. Examples of presence servers include presence servers as defined by the Internet Engineering Task Force in Request for Comments 2778.

As will be described in more detail below, presentities 56a-56c include endpoints 64a-64d (and their associated end users 62a-62c) who provide presence information presence server 44 for distribution to or access by presence watchers 58a-58c. Conversely, presence watchers 58a-58c include endpoints 68a-68c (and their associated end users 66a-66c) that receive presence information relating to presentities 56a-56c. Although presentities 56 and presence watchers 58 are illustrated as being exclusive from one another, it is generally recognized that an end user and its associated endpoints may both provide information to and receive information from presence server 44. Accordingly, any end user of presence server 44 may be both a presentity and a presence watcher.

Processor 70, which is illustrated in FIG. 2 as presence summarization logic 70, may include any combination of hardware (microprocessors, controllers, or other suitable computing devices or resources), software, and/or encoded logic that may be used to monitor the presence of a presentity with respect to private network 36. In particular embodiments, processor 70 comprises a single computer or a group of computers that are capable of detecting the presence of end users 62a-c with respect to endpoints 64a-64c. To detect the presence of end users 62a-62c with respect to endpoints 64a-64c, processor 70 may receive information from one or more of presence clients 74a-74c at the end user's endpoint 64a-64c. Thus, processor 70 may receive presence information from an end user's PC, phone, personal digital assistant (PDA) or any other presence client device (e.g., presence clients 74a-72c).

In particular embodiments, presence clients 74 include software or hardware embodied in a telecommunications switch that determines the hook status of a telephone or other device. In other embodiments, presence clients 74 include software that monitors whether an endpoint comprising a computer is logged into. In still other embodiments, presence clients 74 comprise a device that communicates with an ID tag worn by an end user 62 to indicate the location of end user 62. Although particular presence clients 74 are described, a variety of presence clients 74 may be utilized according to the teachings of the invention to provide presence information regarding the availability, location, or activity in which an end user 62 is engaged.

In particular embodiments, the presence information obtained about an end user 62 includes the "state" of that end user 62. For example, end users 62 may be placed in various states, such as a "ready" state, a "not ready" state, and a "talking" state, according to the current status of the endpoint 64 with respect to presence server 44. For example, an end user 62 in a ready state may be ready and able to accept an incoming communication. Accordingly, such an end user 62 may be said to be "available." Conversely, an end user 62 in a not ready state may be away from his desk or otherwise not ready to accept an incoming communication, and an end user 62 in a talking state may be currently participating in an incoming or outgoing communication. In either case, the end user 62 may be said to be "unavailable." Other presence states that may be recognized may include "present", "not present", "active", "inactive", or any other state identifying the availability or activity of an end user 62.

The presence information gathered by processor 70 may be stored in a memory module 72, which is illustrated in FIG. 2 as a present state store 72. Memory module 72 may include any form of volatile or non-volatile memory including, without limitation, magnetic media, optical media, random access memory (RAM), read-only memory (ROM), removable media, or any other suitable local or remote memory component. For example, when network user 62a who is associated with network endpoint 64a is given access to applications and other network resources available to network endpoint 64a from a remote endpoint 34, presence information maintained in memory module 72 may be updated to identify the network user's presence on network endpoint 64a. Stated differently, the presence information associated with network user 62a may be updated by presence server 44 to show network user 62a as present on network endpoint 64a in memory module 72. In particular embodiments, the presence information may be updated to identify network user 62a as present at the IP address associated with network endpoint 64a. This is true even though network user 62a is actually accessing private network 36 from an endpoint external to private network 36 (i.e., remote endpoint 34).

As described above, the presence information stored in memory module 72 and the configuration information maintained by configuration server 46 may be used to configure access point 40 for the subsequent processing of messages and data received from sources external to private network 36. In particular embodiments, remote access server 42 may obtain presence information from presence server 44 and configuration information from configuration server 46 to result in the configuration of access point 40. In other embodiments, presence server 44, access point 40 or another network device may effect the configuration of access point 40.

Returning to the above described scenario, the configuration of access point 40 may include the opening of one or more pinholes associated with network endpoint 64a. For example, a network endpoint 64a typically includes various configurations that identify pinholes in access point 40. The pinholes define criteria that, if satisfied by an incoming message or other data, result in the incoming message or data being automatically accepted by access point 40. Example criteria that may be considered by access point 40 may include the source IP address, the source IP port, the protocol, the destination IP address, the destination IP port, and/or other suitable criteria. Thus, incoming messages and other data that are addressed to network endpoint 64a are examined at access point 40 to determine if the messages or data satisfy the pinhole criteria before the messages or data are forwarded to network endpoint 64a. If the criteria is not met the messages or data are not allowed into private network 36.

As described above, access by network user 62a through remote endpoint 34 identifies network user 62a as present on network endpoint 64a. Accordingly, the configurations associated with network endpoint 64a may be applied to remote endpoint 34a. Thus, the maintenance of presence information and configuration information allows the configurations of pinholes associated with network endpoint 64a to follow network user 62a from endpoint to endpoint regardless of the network user's actual location. As a result, when network user 62a accesses private network 36 through remote endpoint 34, the configurations of network endpoint 64a are automatically applied to remote endpoint 34 such that data authorized to be received by network endpoint 64a may also reach remote endpoint 34.

Furthermore, it will be recognized by those of ordinary skill in the art that presence server 44 is merely one example configuration of a presence server for providing presence information to end users in communication system 30. Accordingly, it is generally recognized that presence server 44 may include any number of processors, memory modules, or other components to accomplish the functionality and features described herein. Additionally, processor 70, and/or memory module 72 associated with presence server 44 may be centrally located (local) with respect to one another, or distributed throughout private network 36.

Figure 3:
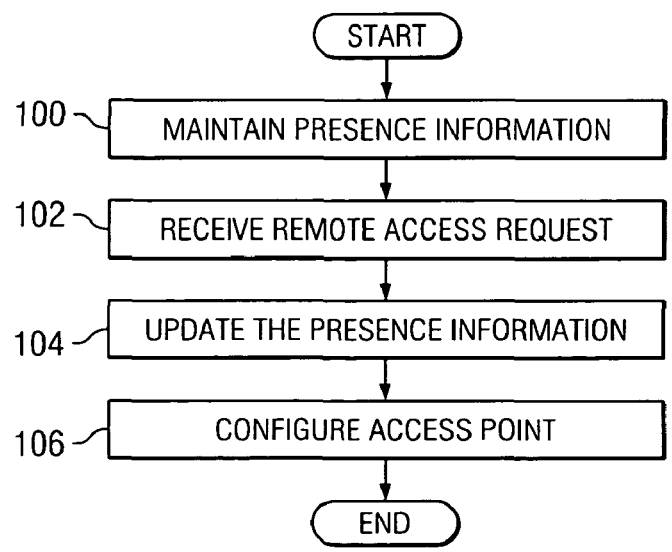
FIG. 3 illustrates an example method that uses presence information to manage remote access to the network, in accordance with an embodiment of the present invention.

FIG. 3 illustrates an example method that uses presence information to manage remote access to private network 36. The method begins at step 100 with the maintenance of presence information. As described above, the presence information may include availability or activity information for a plurality of network end users, including first end user 62a.

At step 102, a remote access request is received at access point 40. The remote access request may be generated by a network user, such as first end user 62a, who is seeking to access private network 36 through remote endpoint 34. For example, first end user 62a, who is associated with first endpoint 64a, may seek to access private network 36 through public network 38. In particular embodiments, the network access request may include a VNC request generated from remote endpoint 34. VNC or another authentication protocol may then be used to verify the identity of the network user.

At step 104, the presence information associated with the network user may be updated to identify the presence of the network user at a network endpoint within private network 36. Thus, where first end user 62a accesses private network 36 using remote endpoint 34, presence information maintained by presence server 44 or another network device may be updated to identify first end user 62a as present on first network endpoint 64a. In particular embodiments, an IP address associated with first network endpoint 64a may be identified. The presence information may then be updated to identify the presence of first end user 62a at first endpoint 64a.

At step 106, access point 40 may be configured to allow any communications addressed to an IP address associated with the network endpoint to pass through access point 40. Thus, where the presence information is updated to identify first end user 62a as present at first network endpoint 64a, access point 40 may be configured to allow any communications addressed to an IP address associated with first network endpoint 64a to pass through access point 40. In particular embodiments, the configuration of access point 40 may include the opening of one or more pinholes in a firewall. Specifically, access point configurations stored in configuration server 46 or another network component may be obtained and applied to remote endpoint 34. The access point configurations may be applied by access point 40 to authorize communications addressed to the IP address associated with first network endpoint 64a.

Some of the steps illustrated in FIG. 3 may be combined, modified or deleted where appropriate, and additional steps may also be added to the flowchart. Additionally, steps may be performed in any suitable order without departing from the scope of the invention.

As indicated above, technical advantages of particular embodiments of the present invention include the automatic configuration of an access point to a private network based upon presence information for a network user. The automatic configuration allows communications addressed to an IP address associated with a network endpoint associated with the network user to automatically pass through the access point. A further technical advantage may be that the maintenance of presence information, may allow a configurations of pinholes associated with a network endpoint to follow a network user from endpoint to endpoint regardless of the network user's actual location. As a result, when the network user accesses the private network through a remote endpoint, the configurations of a network endpoint associated with the user are automatically applied to the remote endpoint.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within a communication system, these elements may be combined, rearranged or positioned in order to accommodate particular routing architectures or needs. In addition, any of these elements may be provided as separate external components to a communication system or to each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method using presence information to manage network access, comprising:
   maintaining presence information for an end user associated with a first network endpoint included in a private network;
   receiving a remote access request from the end user at a remote endpoint located external to the private network, the remote access request requesting access to the private network for the remote endpoint;
   in response to receiving a remote access request, updating, by a hardware processor, the presence information for the end user to identify the presence of the end user at least a first network endpoint included in a private network; and
   based on the updated presence information, automatically configuring an access point to the private network to allow any communications addressed to the first network endpoint from a second network endpoint included in the private network to pass through the access point, automatically configuring the access point comprising copying stored pinhole configuration information of the first network endpoint to pinhole configuration information of the remote endpoint.

2. The method of claim 1, wherein maintaining the presence information comprises determining the availability of the end user at the first network endpoint included in the private network.

3. The method of claim 1, wherein receiving the remote access request comprises receiving the remote access request from the remote endpoint that is external to the private network.

4. The method of claim 1, further comprising:
   using an authentication protocol to verify the identity of the end user upon receiving the remote access request.

5. The method of claim 1, wherein receiving the remote access request comprises receiving a Virtual Network Computing (VNC) request.

6. The method of claim 1, wherein updating the presence information for the end user comprises:
   identifying an IP address associated with the end user; and
   identifying the presence of the end user at a network endpoint associated with the IP address.

7. The method of claim 1, further comprising:
   receiving a communication identified for the end user; and
   allowing the communication to pass through the access point.

8. The method of claim 1, further comprising:
   determining that the end user is no longer using the remote endpoint to access the private network; and
   automatically configuring the access point to disallow any communications addressed to the first network endpoint from passing through the access point.

9. The method of claim 8, further comprising:
receiving a communication identified for the IP address; and
preventing the communication from passing through the access point.

10. A system using presence information to manage network access, comprising:
a presence server in communication with at least a first network endpoint included in a private network, the presence server operable to:
maintain presence information identifying the presence of an end user associated with the first network endpoint; and
in response to receiving a remote access request, update the presence information for the end user when a remote access request is received from the end user at a remote endpoint located external to the private network; and
a remote access server in communication with the private network, the remote access server operable to:
receive the remote access request from the end user at the remote endpoint, the remote access request requesting access to the private network for the remote endpoint; and
automatically configure, based on the updated presence information, an access point to the private network to allow any communications addressed to the first network endpoint from a second network endpoint included in the private network to pass through the access point, the automatically configuring the access point comprising copying stored pinhole configuration information of the first network endpoint to pinhole configuration information of the remote endpoint.

11. The system of claim 10, wherein the presence server is further operable to determine the availability of the end user at the first network endpoint associated with the private network.

12. The system of claim 10, wherein the remote access server is operable to receive the remote access request from a remote endpoint that is external to the private network.

13. The system of claim 10, wherein the remote access server is further operable to use an authentication protocol to verify the identity of the end user upon receiving the remote access request.

14. The system of claim 10, wherein the remote access request comprises a Virtual Network Computing (VNC) request.

15. The system of claim 10, wherein the presence server is operable to update the presence information for the end user by:
identifying an IP address associated with the end user; and
identifying the presence of the end user at a network endpoint associated with the IP address.

16. The system of claim 10, wherein the remote access server is further operable to:
receive a communication identified for the end user; and
allow the communication to pass through the access point.

17. The system of claim 10, wherein:
the presence server is further operable to determine that the end user is no longer using the remote endpoint to access the private network; and
the remote access server is further operable to automatically configure the access point to disallow any communications addressed to the first network endpoint from passing through the access point.

18. The system of claim 17, wherein the remote access server is further operable to:
receive a communication identified for the IP address; and
prevent the communication from passing through the access point.

19. A system using presence information to manage network access, comprising:
means for maintaining presence information for an end user associated with a first network endpoint included in a private network;
means for receiving a remote access request from the end user at a remote endpoint located external to the private network, the remote access request requesting access to the private network for the remote endpoint;
means for updating the presence information in response to receiving a remote access request, for the end user to identify the presence of the end user at least a first network endpoint included in a private network; and
means for automatically configuring, based on the updated presence information, an access point to the private network to allow any communications addressed to the first network endpoint from a second network endpoint included in the private network to pass through the access point, the automatically configuring the access point comprising copying stored pinhole configuration information of the first network endpoint to pinhole configuration information of the remote endpoint.

20. Logic embodied in a tangible computer readable medium, the tangible computer readable medium comprising code operable to:
maintain presence information for an end user associated with a first network endpoint included in a private network;
receive a remote access request from the end user at a remote endpoint located external to the private network, the remote access request requesting access to the private network for the remote endpoint;
in response to receiving a remote access request, updating the presence information for the end user to identify the presence of the end user at least a first network endpoint included in a private network; and
based on the updated presence information, automatically configuring an access point to the private network to allow any communications addressed to the first network endpoint from a second network endpoint included in the private network to pass through the access point, the automatically configuring the access point comprising copying stored pinhole configuration information of the first network endpoint to pinhole configuration information of the remote endpoint.

* * * * *